United States Patent [19]

Takahashi et al.

[11] Patent Number: 4,590,086

[45] Date of Patent: May 20, 1986

[54] PROCESS FOR THE PRODUCTION OF A WATER-IN-OIL-IN-WATER EMULSION FOR FOODS

[75] Inventors: Yasuyuki Takahashi, Higashimurayama; Toshiro Yoshida, Kodaira; Takeshi Takahashi, Higashimurayama, all of Japan

[73] Assignee: Meiji Milk Products Company Limited, Tokyo, Japan

[21] Appl. No.: 729,192

[22] Filed: May 1, 1985

Related U.S. Application Data

[63] Continuation-in-part of Ser. No. 598,282, Feb. 9, 1984, abandoned.

[30] Foreign Application Priority Data

Oct. 1, 1982 [JP] Japan ................................ 57-170954
Aug. 12, 1983 [JP] Japan ................................ 58-146689

[51] Int. Cl.$^4$ ............................................. A23D 5/02
[52] U.S. Cl. .................................... 426/602; 426/604; 426/654; 252/312
[58] Field of Search ............... 426/602, 604, 611, 612, 426/654, 613; 252/312

[56] References Cited

U.S. PATENT DOCUMENTS 2,575,874 11/1951 Herlow ................................ 426/602
3,917,859 11/1975 Terada et al. ...................... 426/602

FOREIGN PATENT DOCUMENTS 040874 12/1981 European Pat. Off. ............ 426/602

OTHER PUBLICATIONS

McCutcheon's Emulsifiers and Detergents, 1981 Intl. ed., MC Publ. Co., Glen Rock, NJ, 1981, pp. 5 and 15.

*Primary Examiner*—Robert Yoncoskie
*Attorney, Agent, or Firm*—Browdy and Neimark

[57] ABSTRACT

The present invention relates to a process for the production of a water-in-oil-in-water (W/O/W) type multiple emulsion for foods, which is very fine and exhibits excellent stability. A stable W/O/W type multiple emulsion is obtained by using a polyglycerol polyricinoleate to obtain a fine W/O emulsion in a primary emulsification, and adding a water phase containing an emulsifier to the resulting W/O emulsion and mixing by agitating in a secondary emulsification.

3 Claims, 1 Drawing Figure

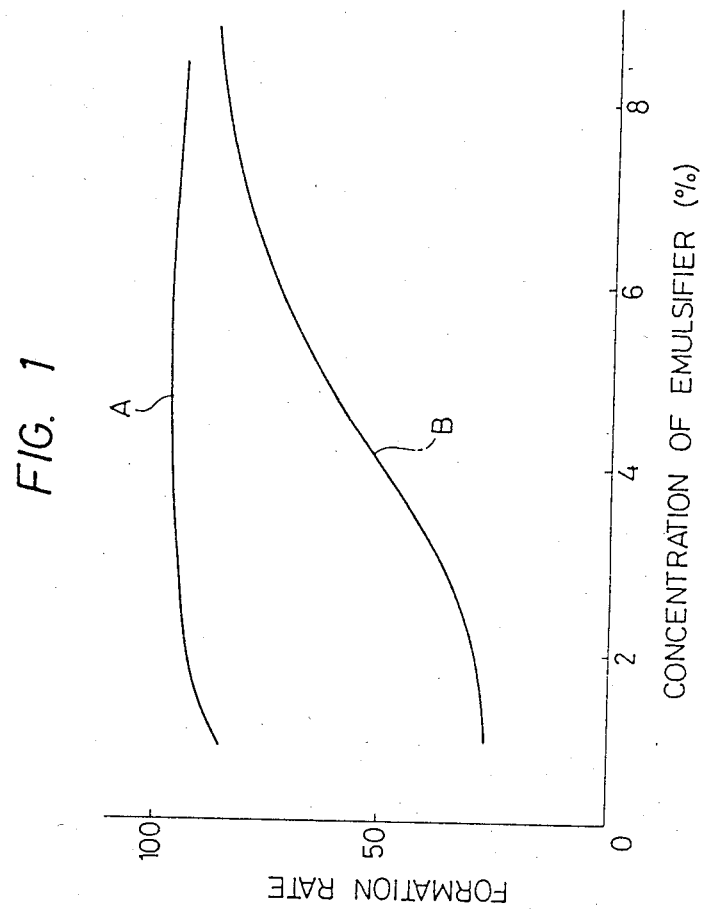

PROCESS FOR THE PRODUCTION OF A WATER-IN-OIL-IN-WATER EMULSION FOR FOODS

DESCRIPTION

This application is a continuation-in-part of Ser. No. 598,282 filed Feb. 9, 1984 now abandoned.

1. Technical Field

The present invention relates to a process for the production of a W/O/W type multiple emulsion for foods, which is very fine and has excellent stability.

The present invention provides a W/O/W type multiple emulsion which is very suitable for use in foods such as whip topping, coffee whitener, imitation ice cream, and the like.

2. Background Art

Generally, W/O/W type multiple emulsions are very fine and very smooth to the touch of the skin. Therefore, their use for various purposes such as cosmetics, pharmaceutical preparations and foods is expected.

Heretofore, the preparation of the W/O/W type multiple emulsions have been conducted in such a manner that the primary emulsification is conducted by using a Span emulsifier such as sorbitan monooleate in an amount of at least 10% based on that of oil and then the secondary emulsification is conducted.

However, when an emulsifier is used in an amount of 10% or more based on that of oil, the taste of the emulsifier is unfavorably strong, so that the resulting emulsion could not be used generally for foods in particular.

DISCLOSURE OF INVENTION

We have made studies on the reduction of the amount of an emulsifier in the primary emulsification and succeeded in remarkably reducing it by using a polyglycerol polyricinoleate (i.e. a polyglycerol ester of a polycondensed fatty acid of castor oil) in the primary emulsification. We have also found that when the polyglycerol polyricinoleate is used in the primary emulsification, it is possible to obtain a finer emulsion by a conventional process for the production of a W/O emulsion comprising adding a water phase to an oil phase as well as by a process wherein an oil phase is added to a water phase to form an O/W emulsion and the emulsion is further agitated to reverse the phase into a W/O emulsion.

However, we have encountered a trouble in that when the obtained W/O emulsion is subjected to a conventional secondary emulsification, a considerable amount of the first W/O emulsion is broken. Said conventional secondary emulsification comprises adding a W/O emulsion to the water phase under agitating and further continuing the agitating for a while. We have found, however, the added W/O emulsion immediately strikes against agitating blades revolving in the water phase in this method, so that a considerable portion thereof is broken by a strong shock and the amount of fine water droplets in the oil is reduced.

We have made studies on preventing the W/O emulsion in the secondary emulsification from being broken, and have found that when the W/O emulsion is agitated after the completion of the addition of a water phase containing an emulsifier to the emulsion to rapidly form a W/O/W type multiple emulsion, most of the initial W/O emulsion is not broken. Namely, when a conventional agitator provided with agitating blades at its lower part is used and the water phase is added to the W/O emulsion, the water phase goes down by its weight. Therefore, the water phase directly strikes against the agitating blades and is strongly shocked so that when both are agitated, the W/O emulsion is sucked into the water phase and a strong shock is not gotten on the whole with the result that the W/O emulsion can be largely prevented from being broken.

BRIEF DESCRIPTION OF DRAWING

FIG. 1 is a drawing showing the formation rate of a W/O/W oil and fat composition obtained by changing the concentration of each emulsifier in Test Example 1.

The present invention relates to a process for the production of a W/O/W type multiple emulsion characterized by adding a water phase containing an emulsifier to a W/O emulsion obtained from a water phase and oil or fat containing a polyglycerol polyricinoleate, and then mixing said phases under homogenization conditions effective to produce said multiple emulsion.

The polyglycerol polyricinoleates used in the present invention are represented by the following formula (I):

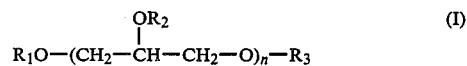

$$R_1O-(CH_2-CH-CH_2-O)_n-R_3 \quad\quad (I)$$
$$\overset{|}{OR_2}$$

wherein n represents a number of 2 to 12 and $R_1$, $R_2$ and $R_3$ each represent a hydrogen atom or a polyricinoleic acid of the following formula (II):

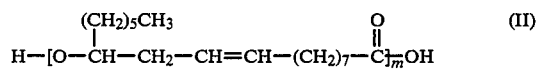

$$H-[O-CH-CH_2-CH=CH-(CH_2)_7-C]_{\overline{m}}OH \quad\quad (II)$$
$$\overset{|}{(CH_2)_5CH_3}\quad\quad\overset{O}{\|}$$

in which m represents a number of 2 to 10.

The polyglycerol polyricinolates of the above formula may be used either solely or in the form of a suitable mixture of two or more of them in the present invention.

In the process of the present invention, the polyglycerol polyricinoleate in an amount of 0.1 to 5%, preferably 0.7 to 2.5%, particularly 1.0 to 2.3% based on that of oil is first mixed with oil or fat. Any oils or fats such as soybean oil, palm oil, palm kernel oil, hardened soybean oil, and the like may be used. In using a hardened oil, the oil is melted by heating before use.

Separately, water is provided. Various additives may be added to the water to prepare a water phase. Further, the water phase may be warmed.

There are two methods for producing the W/O emulsion in the present invention. In the first method, a water phase is successively mixed with an oil phase to directly form the W/O emulsion. In the second method, an oil phase is successively mixed with a water phase to first form an O/W emulsion which is then well agitated to reverse the phase into a W/O emulsion. Since polyglycerol polyricinoleate is used as an emulsifier in the present invention, a W/O emulsion containing fine water droplets can be obtained by any of the above-mentioned two methods, but the second method involving the phase reversal is preferred because finer uniform water droplets can be obtained.

In the second method wherein the phase reversal is effected, oil and fat to which a polyglycerol polyricinoleate has been added is successively mixed with a water phase. Examples of the polyglycerol polyricinoleate include tetraglycerol polyricinoleate, hexaglycerol polyricinoleate, and decaglycerol polyricinoleate. These esters may be used either alone or as an arbitrary mixture of them.

Large amounts of oil and water should not be mixed at once in order to obtain a fine emulsion. Though the amounts of oil and water may be properly chosen according to the purpose, a ratio of oil to water is preferably 3:1 to 1:3 to effect the phase reversal.

The phase reversal of the produced O/W emulsion into a W/O emulsion is achieved by thoroughly agitating said O/W emulsion in T. K. Homo Mixer (Tokushu Kika Kogyo Co. Ltd., Osaka, Japan). A very fine, smooth emulsion can be obtained by this phase reversal. Further, various additives can be enclosed in the water phase present in the oil. Preferably, the stirring is conducted vigorously at about 3000 to 8000 r.p.m. in T.K. Homo Mixer. Alternatively, a homogenizer or a agitating apparatus such as Votator may be used. Preferably, the W/O emulsion is heated at a temperature of 50° to 80° C. so as to conduct the subsequent emulsification smoothly.

Separately, a water phase is prepared. Sodium caseinate, starch, gum and emulsifier or mixtures thereof are added to water. Though any of hydrophilic emulsifiers may be used here as the emulsifier, sucrose fatty acid ester is preferred. Other additives such as pigment or flavouring agent may be added according to the purpose. Preferably, the water phase is heated at a temperature of 50° to 80° C. so as to conduct emulsification smoothly.

Addition may be conducted in any order. For the convenience of operation, however, the W/O emulsion is first introduced into an agitator and the water phase containing an emulsifier is then introduced thereinto. Any agitator which does not give a shock from the agitating blades directly to the W/O emulsion present in the upper part may be used. For example, an agitator which is provided with agitating blades near its bottom, one which is of a suction type provided with agitating blades in its entirety, or one which performs only suction and mixing may be used.

The water phase is mixed with the above W/O emulsion by agitating, for example, at 250 r.p.m. for 5 minutes in an agitator and then treated with a homogenizer. The product is a very fine W/O/W type emulsion.

In this way, a stable W/O/W type emulsion which contains very fine water droplets can be obtained. Therefore, imitation milk, or similar products of imitation milk and processed products thereof which are low fat and yet feel thickness, as well as whip topping, coffee whitener, imitation ice cream or the like can be produced by utilizing this emulsion.

TEST 1

1%, based on the oil, of a polyglycerol polyricinolate having a degree of polymerization of glycerol and a degree of condensation of ricinoleic acid as shown in Table 1 was added as an emulsifier to 300 g of hardened soybean oil at 50° C. and mixed.

The mixture was added slowly to 200 g of water at 50° C. to obtain an O/W emulsion, which was agitated with T.K. Homo Mixer at 6000 rpm to effect the phase inversion. Thus, a W/O emulsion was obtained.

500 g of water containing 1% of sodium caseinate and 2% of sorbitan monostearate was heated to 70° C. The W/O emulsion heated to 70° C. was added thereto and the mixture was agitated in a agitator having agitating blades arranged at the bottom thereof at 250 rpm for 5 min. The mixture was further treated in a homogenizer at 100 kg/cm² and cooled to 5° C.

The W/O/W emulsion formation rate was examined to obtain the results shown in Table 1.

The W/O/W emulsion formation rate was determined according to a method of Matsumoto et al., described in "Yukagaku" 26 (10), 655 (1977).

TABLE 1

| Degree of polymerization of glycerol (n) | Degree of condensation of ricinoleic acid (m) | | | | |
|---|---|---|---|---|---|
| | 2 | 3 | 4 | 5 | 6 |
| 2 | 70% | 72% | 72% | 74% | 75% |
| 3 | 75 | 76 | 76 | 77 | 78 |
| 4 | 87 | 93 | 95 | 95 | 94 |
| 5 | 85 | 90 | 94 | 95 | 94 |
| 6 | 88 | 89 | 93 | 95 | 94 |

The figures represents the formation rate.

Symbols n and m in Table 1 are as defined in the above formulae (I) and (II).

TEST 2

(Varieties of emulsifiers for the outer aqueous phase)

The same procedure as in Test 1 was repeated except that 1%, based on the oil, of a polyglycerol polyricinoleate having a degree of polymerization of glycerol of 4 and a degree of condensation of ricinoleic acid of 5 was used and that the emulsifier was replaced with another emulsifier which was added in an amount of 2% based on the outer aqueous phase to obtain a W/O/W emulsion. The formation rate of the W/O/W emulsion was examined to obtain the results shown in Table 2.

The W/O/W emulsion formation rate was determined in the same manner as in Test 1.

TABLE 2

| Emulsifier | Formation rate |
|---|---|
| sugar ester (HLB 15.0) | 95 |
| sugar ester (HLB 13.0) | 95 |
| sugar ester (HLB 11.0) | 95 |
| sugar ester (HLB 9.5) | 94 |
| sugar ester (HLB 8.0) | 91 |
| sugar ester (HLB 6.0) | 87 |
| sugar ester (HLB 2.0) | 82 |
| sugar ester (HLB 1.0) | 75 |
| sorbitan monostearate | 90 |
| sorbitan tristearate | 82 |
| propylene glycol monostearate | 90 |
| glycerol monostearate | 83 |
| glycerol distearate | 73 |
| diglycerol monostearate | 87 |
| tetraglycerol monostearate | 90 |
| octaglycerol monostearate | 90 |
| decaglycerol monostearate | 92 |
| polyoxyethylene(20)sorbitan monostearate | 92 |
| citric monoglyceride (monostearate) | 88 |
| acetic monoglyceride (monostearate) | 85 |
| succinic monoglyceride (monostearate) | 86 |
| lactic monoglyceride (monostearate) | 85 |
| diacetyltartaric monoglyceride (monostearate) | 87 |
| lecithin | 90 |

TEST 3

The same procedure as in Test 1 was repeated using various polyglycerol polyricinoleates and emulsifiers for the outer aqueous phase. In this test, 1%, based on the oil, of the polyglycerol polyricinoleate and 2%, based on the outer aqueous phase, of the emulsifier were used and the W/O/W emulsion formation rate was determined to obtain the results shown in Table 3.

The W/O/W emulsion formation rate was determined in the same manner as in Test 1.

TABLE 3

| Emulsifier for outer aqueous phase | Formation rate (%) Polyglycerol polyricinoleate | | | | | |
|---|---|---|---|---|---|---|
| | Degree of polymerization of glycerol (n) | Degree of condensation of ricinoleic acid (m) | | | | |
| | | 2 | 3 | 4 | 5 | 6 |
| Sugar ester (HLB 13.0) | 2 | 70 | 73 | 72 | 74 | 74 |
| | 3 | 76 | 76 | 77 | 77 | 77 |
| | 4 | 85 | 92 | 95 | 95 | 94 |
| | 5 | 86 | 91 | 94 | 95 | 95 |
| | 6 | 86 | 91 | 95 | 94 | 94 |
| Sugar ester (HLB 8.0) | 2 | 67 | 70 | 70 | 70 | 71 |
| | 3 | 72 | 73 | 73 | 73 | 74 |
| | 4 | 83 | 89 | 90 | 91 | 90 |
| | 5 | 84 | 88 | 91 | 92 | 91 |
| | 6 | 82 | 88 | 91 | 92 | 92 |
| Sugar ester (HLB 2.0) | 2 | 62 | 63 | 63 | 64 | 65 |
| | 3 | 68 | 69 | 70 | 70 | 71 |
| | 4 | 80 | 80 | 82 | 82 | 81 |
| | 5 | 80 | 81 | 82 | 82 | 82 |
| | 6 | 81 | 81 | 81 | 82 | 81 |
| Sorbitan monostearate | 2 | 70 | 70 | 72 | 71 | 72 |
| | 3 | 73 | 73 | 76 | 75 | 75 |
| | 4 | 82 | 87 | 90 | 90 | 90 |
| | 5 | 81 | 87 | 90 | 90 | 89 |
| | 6 | 81 | 87 | 89 | 90 | 89 |
| Glycerol monostearate | 2 | 64 | 64 | 65 | 66 | 67 |
| | 3 | 65 | 69 | 69 | 71 | 71 |
| | 4 | 80 | 81 | 83 | 83 | 83 |
| | 5 | 80 | 81 | 82 | 83 | 83 |
| | 6 | 81 | 82 | 82 | 83 | 82 |
| Polyoxyethylene(20) sorbitan monostearate | 2 | 70 | 73 | 73 | 73 | 75 |
| | 3 | 73 | 74 | 76 | 76 | 76 |
| | 4 | 84 | 89 | 92 | 92 | 92 |
| | 5 | 85 | 90 | 92 | 91 | 92 |
| | 6 | 85 | 89 | 92 | 92 | 92 |
| Lecithin | 2 | 69 | 72 | 70 | 72 | 74 |
| | 3 | 74 | 74 | 76 | 77 | 77 |
| | 4 | 83 | 87 | 90 | 90 | 90 |
| | 5 | 84 | 88 | 90 | 91 | 91 |
| | 6 | 84 | 87 | 89 | 90 | 91 |

TEST 4

The same procedure as in Test 1 was repeated except that the polyglycerol ricinoleate used in Test 1 was replaced with 1%, based on the oil, of a mono- or polyglycerol polyricinoleate and that the degree of polymerization of glycerol and the degree of esterification of ricinoleic acid were altered. The results are shown in Table 4.

TABLE 4

| Degree of polymerization of glycerol | Degree of esterification of ricinoleic acid | | | |
|---|---|---|---|---|
| | 1 | 2 | 3 | 6 |
| 1 | 17% | 19% | 0% | —% |
| 2 | 20 | 18 | 12 | — |
| 3 | 23 | 28 | 25 | — |
| 6 | 20 | 28 | 35 | 43 |
| 10 | 18 | 27 | 35 | 42 |

The figures represent the formation rate.

In the following Tests 5 to 8 and example of the present invention, the polyglycerol polyricinoleate used was a mixture of esters having a degree of polymerization of glycerol of 3 to 4 and a degree of condensation of ricinoleic acid of 4 to 5.

TEST 5

0.5 to 10% (various), based on the oil, of a polyglycerol polyricinoleate or sorbitan monooleate (Span 80) was added to 300 g of hardened soybean oil heated to 50° C. and mixed.

The mixture was added slowly to 200 g of water heated to 50° C. to obtain an O/W emulsion, which was agitated with T.K. Homo Mixer at 6000 rpm to effect the phase inversion. Thus, a W/O emulsion was obtained.

Then 500 g of water containing 2% sugar ester (HLB 15) was heated to 70° C. and added to said W/O emulsion heated to 70° C. The mixture was agitated at 250 r.p.m. in an agitator provided with agitating blades at its bottom for 5 minutes, further treated in a homogenizer under a pressure of 100 Kg/cm$^2$, and cooled to 5° C.

The W/O/W type formation rate of each of the W/O/W type multiple emulsions was measured. The results are shown in FIG. 1, wherein A represents the case where the polyglycerol polyricinoleate was used and B represents the case where Span 80 was used.

It is apparent from FIG. 1 that the polyglycerol polyricinoleate is remarkably superior in obtaining the W/O/W emulsion.

The formation rate of the W/O/W type emulsion was measured according to a method described by Matsumoto et al. [Yukagaku, 26 (10), 655 (1977)].

TEST 6

The procedure of Test 1 was repeated with the following modification of the conditions to produce a W/O/W type composite emulsion and measure the average water droplet diameter and the W/O/W type formation rate of each emulsion.

A: The procedure of Test: 1 was repeated except that the polyglycerol polyricinoleate was used in an amount of 1.0% based on that of oil.

B: The procedure of Test: 1 was repeated except that the polyglycerol polyricinoleate was used in an amount of 1.0% based on that of oil and the primary emulsification was conducted by adding the water phase to the oil phase.

C: A mixture of sorbitan monostearate and sorbitan monooleate (1:1) in place of polyglycerol polyricinoleate was used as an emulsifier in an amount of 1.0% based on that of oil.

D: The same mixture as that of C was used in an amount of 10.0% based on that of oil.

The results are shown in Table 5.

TABLE 5

| | Average water droplet diameter of W/O emulsion | Formation rate % | | | | |
|---|---|---|---|---|---|---|
| | | adjusted diameter | after 1 week | after 2 weeks | after 3 weeks | after 4 weeks |
| A | 0.6 μm | 95.4 | 92.0 | 90.5 | 88.7 | 86.5 |
| B | 1.0 μm | 75.5 | 73.0 | 65.5 | 62.0 | 58.0 |
| C | 2.5 μm | 35.0 | 28.0 | 15.0 | 11.2 | 6.3 |
| D | 1.2 μm | 82.5 | 80.1 | 75.2 | 71.4 | 65.3 |

*Stored at 5° C.

TEST 7

The procedure of Test 6: was repeated except that various emulsifiers were used in place of the polyglycerol polyricinoleate in amounts of 1% based on that of oil to prepare W/O/W type multiple emulsions. The average water droplet diameter and the W/O/W type formation rate of each emulsion were measured. The W/O/W type formation rate after storage at 5° C. for one month was also measured. The results are shown in Table 6.

The measurement of the W/O/W type formation rate was conducted in the same manner as that described in Test 1.

TABLE 6

|   | | Average water droplet diameter | Formation rate (%) | Formation rate (%) after one month at 5° C. |
|---|---|---|---|---|
| 1 | polyglycerol polyricinoleate | 0.6 | 95.4 | 86.5 |
| 2 | lecithin | 2.7 | 30.2 | 5.0 |
| 3 | glycerol monostearate | 3.8 | 18.5 | 2.7 |
| 4 | glycerol monooleate | 2.2 | 28.3 | 4.3 |
| 5 | diglycerol monostearate | 4.3 | 14.1 | 3.0 |
| 6 | diglycerol monooleate | 1.8 | 40.2 | 12.0 |
| 7 | sorbitan tristearate | 3.3 | 17.3 | 3.5 |
| 8 | sucrose fatty acid ester (HLB 15) | 4.1 | 11.0 | 4.6 |

TEST 8

The polyglycerol polyricinoleate in an amount of 2% based on that of oil was added to 300 g of hardened soybean oil at 50° C. The mixture was successively added to 200 g of water at 50° C. and agitated at 6000 r.p.m. in T.K. Homo Mixer. During the agitating, the phase was reversed to give a W/O emulsion.

The following test was conducted by using 500 g of an aqueous solution containing 2% sugar ester (HLB 15) heated to 70° C. and said W/O emulsion heated to the same temperature.

The rates of addition of the W/O emulsion to the aqueous solution containing sucrose fatty acid ester were 500, 200 and 100 g/min and the test was conducted by using an agitator at 1200, 500 and 250 r.p.m. in each case. Further tests were conducted by agitating at the above three speeds, after the whole of the aqueous solution containing the sugar ester was added to the W/O emulsion without agitating. The emulsions subjected to these treatments were further treated in a homogenizer under a pressure of 100 Kg/cm² and cooled to 5° C. The formation rate of the W/O/W type multiple emulsion was measured according to a method described by Matsumoto et al. [Yukagaku, 26 (10), 655 (1977)]. The results are shown in Table 7.

TABLE 7

| Mode of addition of W/O emulsion and aqueous solution | | Agitating speed (r.p.m.) | | | |
|---|---|---|---|---|---|
| | | 1200 | 500 | 250 | 100 |
| W/O emulsion added to aqueous solution | Addition rate (%) (g/min) | | | | |
| | 500 | 62 | 86 | 87 | 86 |
| | 200 | 59 | 78 | 84 | 82 |

TABLE 7-continued

| Mode of addition of W/O emulsion and aqueous solution | Agitating speed (r.p.m.) | | | |
|---|---|---|---|---|
| | 1200 | 500 | 250 | 100 |
| 100 | 51 | 69 | 82 | 79 |
| Agitating after the whole of aqueous solution was added to W/O emulsion | 90 | 92 | 95 | 93 |

It is apparent from Table 7 that the emulsion formation rate obtained by agitating at once after the addition of the whole of the aqueous solution to the W/O emulsion is higher than that obtained by adding the W/O emulsion to the aqueous solution containing the sucrose fatty acid ester with agitating and the agitating speed has a small effect thereon.

Further, it is apparent from the Table that when the W/O emulsion is added to the aqueous solution containing the sucrose fatty acid ester with agitating, the formation rate is reduced when the agitating speed is high or the addition rate of the W/O emulsion is low.

EXAMPLE 1

2970 g of hardened soybean oil was heated to 50° C. 30 g of polyglycerol polyricinoleate was added thereto and mixed therewith.

Separately, 2000 g of water was heated to 50° C. While agitating this in a T.K. Homo Mixer at 6000 r.p.m., the above mixture was successively added at a rate of 20 ml/min thereto. During the addition, the phase was reversed from the O/W type to a W/O type to obtain 5000 g of a W/O emulsion.

Separately, 4850 g of water, 100 g of a sugar ester (HLB 15) [DK ESTER F-160 (Trade Mark)] and 50 g of sodium caseinate were mixed together and heated to 70° C. This mixture and the above W/O emulsion heated to 70° C. were introduced into an agitator provided with agitating blades at its bottom, agitated at 250 r.p.m. for 5 minutes, treated in a homogenizer under a pressure of 100 Kg/cm², and then cooled to 5° C. to obtain a W/O/W type multiple emulsion.

The resulting W/O/W type multiple emulsion was very stable over a long period of time, even when stored at ordinary temperature.

What is claimed is:

1. A process for the production of a water-in-oil-in-water (W/O/W) emulsion for foods, which comprises adding a water phase containing an emulsifier to a W/O emulsion obtained from a water phase and oil or fat containing a polyglycerol polyricinoleate, and mixing said phases under homogenization conditions effective to produce said multiple emulsion.

2. A process for the production of a W/O/W emulsion for foods as set forth in claim 1, wherein the W/O emulsion is obtained by mixing oil or fat containing a polyglycerol polyricinoleate with a water phase to form an O/W emulsion and agitating said O/W emulsion to reverse the phases.

3. A process for the production of a W/O/W emulsion for foods as set forth in claim 1, wherein the emulsifier is a sucrose fatty acid ester.

* * * * *